United States Patent
Minase et al.

(10) Patent No.: US 12,428,031 B2
(45) Date of Patent: Sep. 30, 2025

(54) PARKING ASSIST APPARATUS

(71) Applicant: TOYOTA JIDOSHA KABUSHIKI KAISHA, Toyota (JP)

(72) Inventors: Yuki Minase, Toyota (JP); Tsutomu Mochida, Shizuoka-ken (JP); Keisuke Oyama, Nisshin (JP); Daiki Maruki, Toyota (JP); Yu Hiei, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/345,645

(22) Filed: Jun. 30, 2023

(65) Prior Publication Data

US 2024/0067221 A1 Feb. 29, 2024

(30) Foreign Application Priority Data

Aug. 26, 2022 (JP) ................. 2022-134698

(51) Int. Cl.
*B60W 60/00* (2020.01)
*B60W 30/06* (2006.01)
*B60W 50/14* (2020.01)

(52) U.S. Cl.
CPC ........ *B60W 60/0025* (2020.02); *B60W 30/06* (2013.01); *B60W 50/14* (2013.01); *B60W 2420/403* (2013.01); *B60W 2554/00* (2020.02)

(58) Field of Classification Search
None
See application file for complete search history.

(56) References Cited

U.S. PATENT DOCUMENTS

| | | | |
|---|---|---|---|
| 9,522,661 B2 | 12/2016 | Inoue et al. |
| 9,604,638 B2 | 3/2017 | Kiyokawa et al. |
| 9,738,276 B2 | 8/2017 | Kiyokawa et al. |
| 9,828,028 B2 | 11/2017 | Ishijima et al. |
| 9,836,658 B2 | 12/2017 | Kiyokawa et al. |
| 9,875,655 B2 | 1/2018 | Kiyokawa et al. |
| 10,031,227 B2 | 7/2018 | Kiyokawa et al. |
| 10,150,486 B2 | 12/2018 | Hoshino et al. |
| 10,239,520 B2 | 3/2019 | Tomozawa et al. |
| 10,377,416 B2 | 8/2019 | Fukukawa et al. |

(Continued)

FOREIGN PATENT DOCUMENTS

| | | |
|---|---|---|
| JP | 2002-52999 A | 2/2002 |
| JP | 2013-530867 A | 8/2013 |
| JP | 2020-142693 A | 9/2020 |

*Primary Examiner* — Hunter B Lonsberry
*Assistant Examiner* — Henry R Hinton
(74) *Attorney, Agent, or Firm* — Sughrue Mion, PLLC (57) ABSTRACT

A parking assist apparatus is configured to perform a deviation control including at least one of a first notification control and a stop control when the parking assist apparatus determines that a vehicle that is performing an automatic parking deviates from a learned route. The parking assist apparatus is configured to learn, as the learned route, a position of the vehicle in each of multiple learned images that an outside-vehicle camera captures a space including the vehicle and the parking space multiple times while the vehicle is performing a manual parking or the automatic parking; and perform the deviation control when the parking assist apparatus determines that the vehicle deviates based on a position of the vehicle in a comparative image and a position of the vehicle in the learned image.

5 Claims, 6 Drawing Sheets (56) References Cited

U.S. PATENT DOCUMENTS

| | | | |
|---|---|---|---|
| 2013/0085637 A1 | 4/2013 | Grimm et al. | |
| 2016/0203721 A1* | 7/2016 | Wright | G08G 1/168 |
| | | | 348/118 |
| 2018/0246515 A1* | 8/2018 | Iwama | G05D 1/0251 |
| 2020/0282977 A1 | 9/2020 | Hara et al. | |
| 2020/0369319 A1* | 11/2020 | Tabata | G06T 7/0002 |
| 2024/0416895 A1* | 12/2024 | Iida | B62D 15/0285 |
| 2024/0416896 A1* | 12/2024 | Tokuhiro | G06V 20/56 |

\* cited by examiner

| RECOGNITION POSITION RP | IMAGE POSITION PP | LEARNED IMAGE |
|---|---|---|
| RP1 | PP1 | P1 |
| ... | ... | ... |
| RPn | PPn | Pn |

PARKING ASSIST APPARATUS

TECHNICAL FIELD

The present disclosure relates to a parking assist apparatus that performs a deviation control when a vehicle deviates from a learned route while the vehicle is automatically parking in a parking space.

BACKGROUND

Conventionally, there has been known a parking assist apparatus that performs a deviation control when a vehicle deviates from a parking route to a parking space during a manual parking. The manual parking is a parking control that is manually performed by a driver in the vehicle. For example, a parking assist apparatus (hereinafter referred to as a "conventional apparatus") described in Patent Document 1 recognizes a relative position of a vehicle with respect to a parking space (hereinafter referred to as a "recognition position") based on a steering angle and a yaw rate during the manual parking. The conventional apparatus determines whether or not the vehicle has deviated from the parking route by comparing the recognition position with the "parking route to a parking space calculated in advance". When the conventional apparatus determines that the vehicle has deviated from the parking route, the conventional apparatus performs a deviation control for notifying the driver of the deviation.

Patent Document 1: Japanese Patent Application Laid-Open No. 2002-52999

SUMMARY

Since the conventional apparatus recognizes the recognition position based on the steering angle and the yaw rate, the recognition position may deviate from an actual position of the vehicle. If the above-described deviation occurs, the conventional apparatus may erroneously determine that the vehicle does not deviate from the parking route when the actual position of the vehicle deviates from the parking route. As a result, the conventional apparatus may not be able to perform the deviation control when necessary.

When the vehicle deviates from the parking route due to the deviation of the recognition position from the actual position during an automatic parking, there is a possibility that the vehicle cannot park in the parking space. Therefore, during the automatic parking, it is necessary to more accurately determine whether or not the vehicle deviates from the parking route than during the manual parking.

Further, the driver or an occupant may notice the deviation in a manned automatic parking, but there is a high possibility that no one notices the deviation in an unmanned automatic parking. Therefore, in the unmanned automatic parking, it is necessary to determine the deviation more accurately than in the manned automatic parking. It should be noted that manned automatic parking is the automatic parking performed in a state where the driver is in the vehicle, and the unmanned automatic parking is the automatic parking performed in a state where the driver is not in the vehicle.

The present disclosure has been made to address the above-described problem. In other words, an object of the present disclosure is to provide a parking assist apparatus capable of more accurately determining whether or not the vehicle has deviated from the parking route during the automatic parking.

A parking assist apparatus (10) according to the present disclosure (hereinafter, referred to as "the present disclosure apparatus") is configured to perform a deviation control when the parking assist apparatus determines that a vehicle (VA) deviates from a learned route while the vehicle is performing an automatic parking. The automatic parking is a control for automatically parking the vehicle in a parking space (PS). The learned route being a parking route that the parking assist apparatus has learned.

The deviation control includes at least one of a first notification control for notifying a user that the vehicle deviates from the learned route and a stop control for stopping the vehicle.

The parking assist apparatus is configured to:
learn, as the learned route, a position of the vehicle in each of multiple learned images that an outside-vehicle camera acquires by capturing a space including the vehicle and the parking space multiple times while the vehicle is performing a manual parking or the automatic parking to the parking space (step 440); and
perform the deviation control (step 645) when the parking assist apparatus determines that the vehicle deviates from the learned route based on a position of the vehicle in a comparative image (step 625) and a position of the vehicle in the learned image (step 630) (step 640 "Yes"), the comparative image being an image that the outside-vehicle camera acquires while the vehicle is performing the automatic parking after the parking assist apparatus completes learning the learned route.

When the recognition position deviates from the actual position of the vehicle while the vehicle is performing the automatic parking after the present disclosure apparatus learns the learned route, the vehicle deviates from the learned route. In this case, the position of the vehicle in the comparative image acquired by the outside camera deviates from the position of the vehicle in the learned image. The present disclosure apparatus compares the position of the vehicle in the comparative image with the position of the vehicle in the learned image so as to determine whether or not the vehicle deviates from the learned route. Therefore, the present disclosure apparatus can accurately determine whether or not the vehicle deviates from the learned route so as to appropriately perform the deviation control.

DETAILED DESCRIPTION

Figure 1:
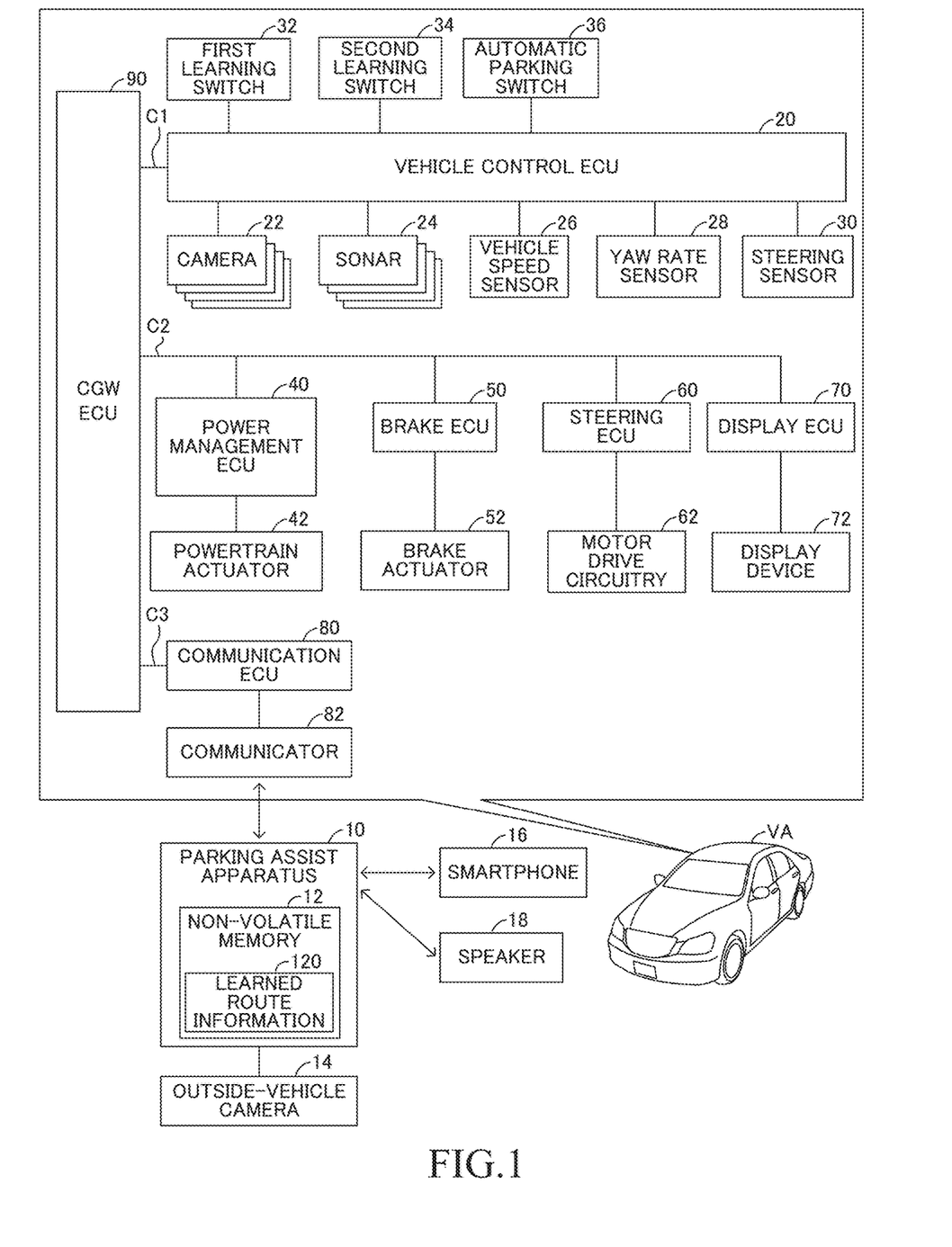
FIG. 1 is a schematic configuration diagram of a system comprising a parking assist apparatus according to an embodiment of the present disclosure.

As illustrated in FIG. 1, a parking assist system comprises a vehicle VA and a parking assist apparatus 10 according to an embodiment of the present disclosure.

Figure 3:
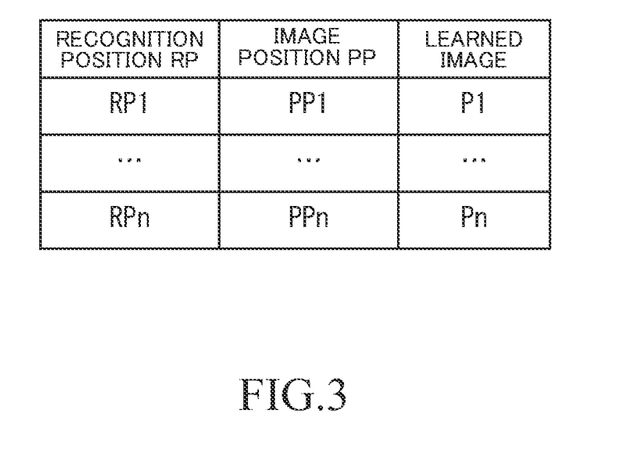
FIG. 3 is an explanatory diagram of learned route information.

The parking assist apparatus 10 includes a processor (CPU), a ROM, a RAM, a non-volatile memory 12, and an interface. learned route information 120 illustrated in FIG. 3 is stored in the non-volatile memory 12.

In a case where the vehicle VA performs an automatic parking, the parking assist apparatus 10 executes a deviation control when the parking assist apparatus 10 determines that the vehicle VA deviates from a parking route (hereinafter, referred to as "learned route") learned in advance. The deviation control includes at least one of a deviation notification control for notifying a user that the vehicle VA has deviated from the learned route, and a stop control for stopping the vehicle VA. The deviation notification control may be referred to as a "first notification control".

The parking assist apparatus 10 is connected to the outside-vehicle camera 14 so that data can be exchanged. The outside-vehicle camera 14 is disposed outside the vehicle VA so that the outside-vehicle camera 14 can capture a predetermined space. The predetermined space is a space including "a parking space PS shown in FIG. 2" and "the vehicle VA traveling in order to park in the parking space". The outside-vehicle camera 14 captures the predetermined space to acquire a captured image. The outside-vehicle camera 14 transmits the captured image to the parking assist apparatus 10.

The parking assist apparatus 10 is connected to a smartphone 16 and/or a speaker 18 so that data can be exchanged. The parking assist apparatus 10 makes a smartphone 16 display a deviation notification window for notifying the deviation when the parking assist apparatus 10 performs the deviation notification control. The parking assist apparatus 10 may make the smartphone 16 or the speaker 18 emit a voice sound (or an alarm sound) for notifying the deviation.

The vehicle VA comprises components shown in FIG. 1.

A vehicle control ECU20 is a ECU that performs the automatic parking which makes the vehicle VA park in the parking space PS without a driver's operation.

In the present specification, the ECU is an electronic control device including a microcomputer as a main part, and is also referred to as a controller. The microcomputer includes a CPU (a processor), a ROM, a RAM, an interface, and the like. Some or all of the vehicle control ECU20 and the plurality of ECUs described below may be integrated into one ECU.

A plurality of cameras 22 includes a front camera, a left camera, a right camera and a rear camera. The front camera, the left camera, the right camera and the rear camera respectively acquire the front image, the left image, the right image and the rear image by capturing a front, a left, a right and a rear of the vehicle VA.

A plurality of sonars 24 are disposed at predetermined positions around a vehicle body of the vehicle VA. Each of sonars 24 transmits ultrasonic waves. Each of sonars 24 obtains a distance between "a reflection point which is a point on the object on which the transmitted ultrasonic wave is reflected" and each of sonars 24 based on a time from the transmission to the reception of the ultrasonic wave.

A vehicle speed sensor 26 detects a speed of the vehicle VA (a vehicle speed SPD). A yaw rate sensor 28 detects a yaw rate of the vehicle VA. A steering angle sensor 30 detects a steering angle of the vehicle VA. The vehicle control ECU20 receives detected values which are detected by these sensors.

A first learning switch 32 is a switch operated by the driver to instruct "the vehicle VA" to perform a first learning. The first learning is a process for causing the vehicle VA to store a route followed by the vehicle VA when the driver manually parks the vehicle VA in the parking space PS. This route is referred to as "manual parking route MPR".

A second learning switch 34 is a switch operated by the driver to instruct "the parking assist apparatus 10" to perform a second learning. The second learning is a process for causing the parking assist apparatus 10 to store a route followed by the vehicle VA when the vehicle VA automatically parks in the parking space PS along the manual parking route MPR. This route is referred to as an "automatic parking route APR".

In the present embodiment, the vehicle VA can perform the manned automatic parking after the vehicle VA learns the manual parking route MPR through the first learning. Details of such automatic parking are described in Japanese Translation of PCT International Application Publication No. 2013-530867. After parking assist apparatus 10 learns the automatic parking route APR through the second learning, the vehicle VA can perform an unmanned automatic parking.

An automatic parking switch 36 is a switch operated by the driver to instruct the vehicle VA to perform the manned automatic parking. When the driver instructs the vehicle VA to perform the unmanned automatic parking, the driver (or the user) may perform a predetermined operation on an input terminal such as a smartphone.

The vehicle control ECU20 receives output values from these switches 32-36.

A power management ECU40 is connected to a powertrain actuator 42. The power management ECU 40 controls the powertrain actuator 42. The powertrain actuator 42 changes a driving force generated by a driving source (for example, an internal combustion engine and/or an electric motor) of the vehicle VA. Furthermore, in the present example, the powertrain actuator 42 can also change a shift position of a transmission (not shown). A brake ECU50 is connected to a brake actuator 52 and controls the brake actuator 52. The brake actuator 52 changes a braking force applied to the vehicle VA. The steering ECU60 controls a motor drive circuitry 62 to drive a steering assist motor (not shown) to change the steering angle of the vehicle VA.

The display ECU70 causes a display device 72, which is a touch panel, to display a landscape image of a traveling direction of the vehicle VA, a bird's-eye view image of the vehicle VA and around the vehicle VA, and the like. The communication ECU80 is connected to a communicator 82 for wirelessly exchanging data with the parking assist apparatus 10.

A CGW (control gateway) ECU90 controls transmission/reception of data between a plurality of ECUs via a "first communication line C1, a second communication line C2, and a third communication line C3".

(Operation)

Figure 2:
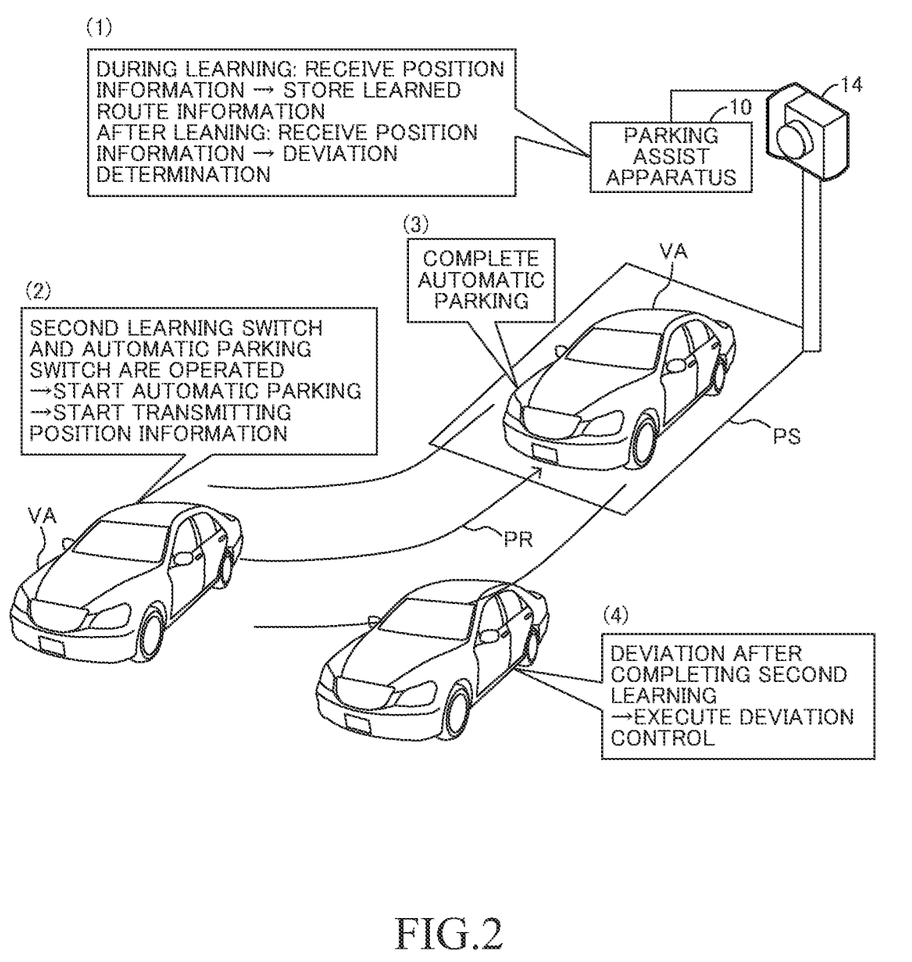
FIG. 2 is an explanatory diagram of an operation of the parking assist apparatus.

When the second learning switch 34 and the automatic parking switch are operated, the vehicle control ECU20 starts the automatic parking and recognizes the position of the vehicle VA with respect to a predetermined reference position (hereinafter, referred to as "recognition position RP"). The vehicle control ECU20 transmits the position information including the recognized position RP to the parking assist apparatus 10. For example, the vehicle control ECU20 recognizes the recognition position RP based on the front image, the left image, the right image, and the rear image. As another example, the vehicle control ECU20 may recognize the recognized position RP based on the vehicle speed SPD, the yaw rate, and the steering angle. The vehicle control ECU20 causes the power management ECU40, the brake ECU50, and the steering ECU60 to control the powertrain actuator 42, the brake actuator 52, and the motor drive circuitry 62, respectively, so that the vehicle speed SPD is equal to or lower than a predetermined speed, the recognition position RP moves along the manual parking route MPR, and the vehicle VA stops in the parking space PS. The reference position is a midpoint between a left rear wheel and a right rear wheel of the vehicle VA when the vehicle VA stops in the parking space PS.

Upon receiving the position information, the parking assist apparatus 10 acquires the captured image acquired by the outside-vehicle camera 14 as a "learned image LI", and specifies an image position PP that is a position of the vehicle VA in the learned image LI. The parking assist apparatus 10 stores, in the nonvolatile memory 12, the learned route information 120 in which the recognition position RP included in the position information, the image position PP, and the learning image LI are associated with each other (see FIG. 3). When the vehicle VA reaches the parking space PS (that is, when the automatic parking is completed), the parking assist apparatus 10 determines that the second learning of the parking route PR has been completed if the learned route information 120 satisfies a learning completion condition described later. The parking route specified by the image position PP of the learned route information 120 is referred to as a "learned route".

When the vehicle VA parks in the parking space PS after the second learning is completed, the vehicle control ECU 20 also transmits the position information to the parking assist apparatus 10. When the parking assist apparatus 10 receives the position information, the parking assist apparatus 10 acquires the captured image acquired by the outside camera 14 as a "comparative image CI", and acquires the image position PP of the learned route information 120 closest to the recognition position RP included in the position information as a learned image position LPP. Then, the parking assist apparatus 10 determines whether or not a distance D between the position of the vehicle VA (a present image position CPP) in the comparative image CI and the learned image position LPP is equal to or smaller than a threshold distance Dth. When the distance D is greater than the threshold distance Dth, the parking assist apparatus 10 determines that the vehicle VA has deviated from the learned route so as to perform the deviation control.

Figure 4:
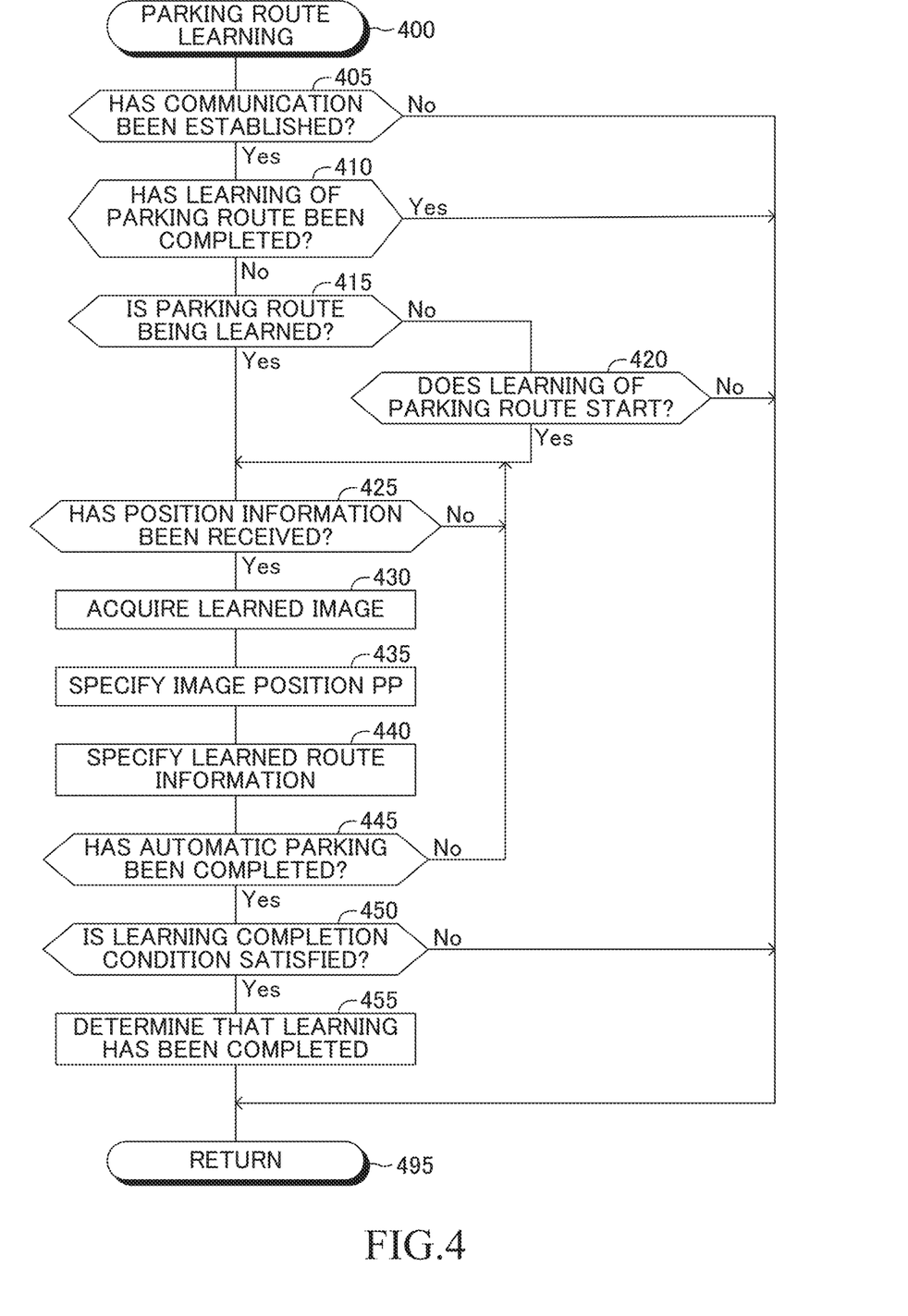
FIG. 4 is a flowchart of a program to be executed by a CPU of the parking assist apparatus.
Figure 5:
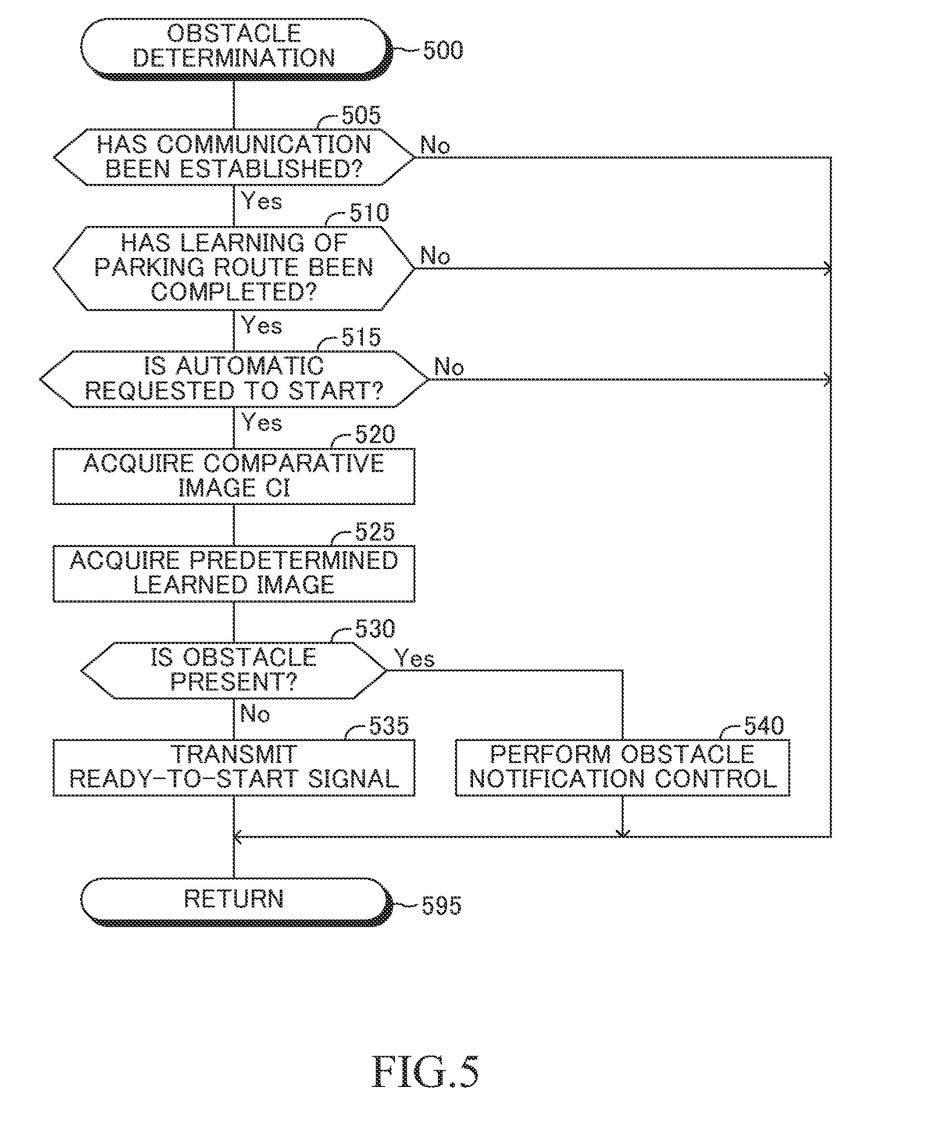
FIG. 5 is a flowchart of a program to be executed by the CPU of the parking assist apparatus.
Figure 6:
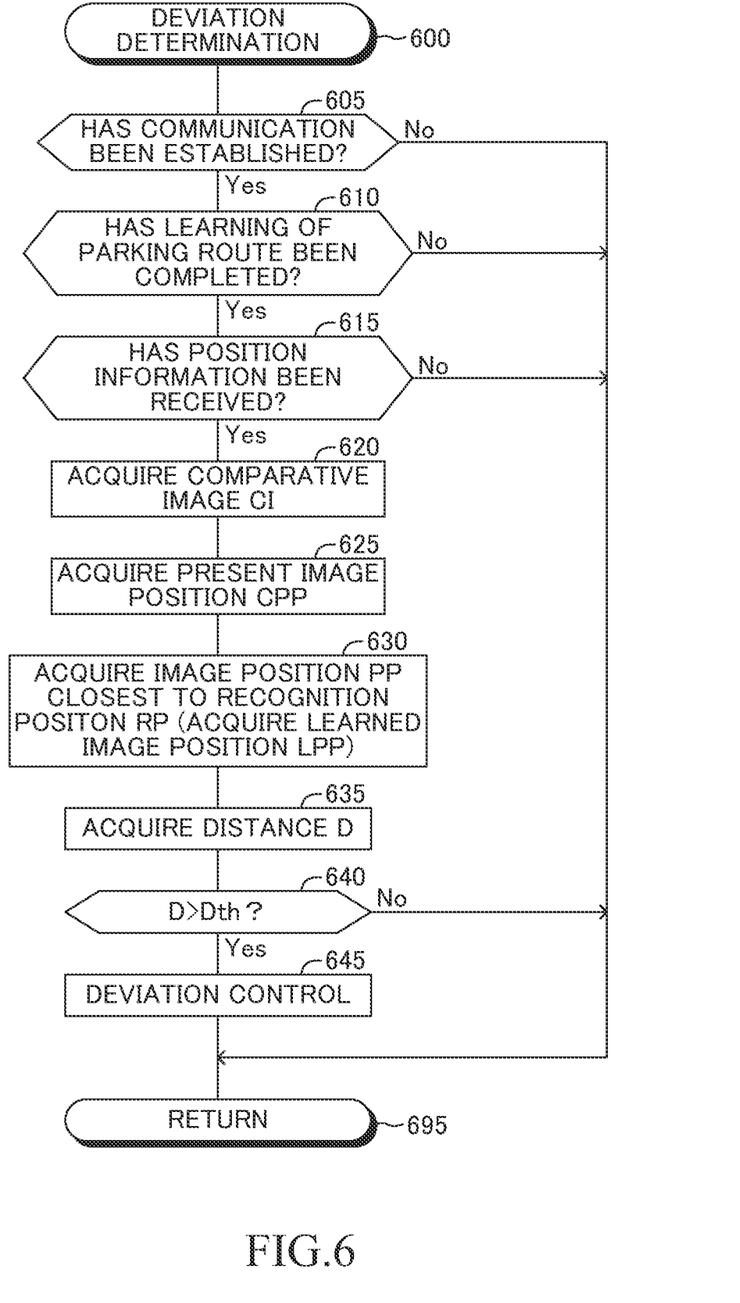
FIG. 6 is a flowchart of a program to be executed by the CPU of the parking assist apparatus.

The CPU of the parking assist apparatus 10 executes routines illustrated by flowcharts in FIGS. 4 to 6.

<Parking Route Learning Routine>

When an appropriate time point comes, a process starts at step 400 of FIG. 4 and the process proceeds to step 405. In step 405, the CPU determines whether or not a communication with the communicator 82 of the vehicle VA has been established.

When the CPU determines that the communication has been established, the CPU determines in step 410 whether or not the learning of the parking route PR of the "vehicle VA in which the communication has been established" has been completed (that is, whether or not the second learning has been completed). When the CPU determines that the learning of the parking route PR has not been completed, the CPU determines in step 415 whether or not the parking route PR is being learned.

When the CPU determines that the parking route PR is not being learned, the CPU determines in step 420 whether or not the learning of the parking route PR of the "vehicle VA in which communication is established" starts. More specifically, the CPU determines that the learning of the parking route PR is started when the CPU detects that the second learning switch 34 is operated.

When the CPU determines that the learning of the parking route PR starts, the CPU determines in step 425 whether or not the position information has been received. When the CPU determines that the position information has been received, the CPU executes steps 430 to 445.

Step 430: The CPU acquires the captured image as the learned image LI from the outside-vehicle camera 14.

Step 435: The CPU specifies the position of the vehicle VA in the learned image LI as the image position PP.

Step 440: The CPU stores, in the nonvolatile memories 12, the learned route information 120 in which the recognition position RP, the image position PP, and the learned image LI are associated with each other.

Step 445: The CPU determines whether or not the vehicle VA has reached the parking space PS so that the automatic parking has been completed.

When the CPU determines that the automatic parking has not been completed, the process returns to step 425 so that the CPU determines again whether or not the position information has been received.

When the CPU determines that the automatic parking has been completed, the CPU determines in step 450 whether or not the learning completion condition is satisfied.

Specifically, when both of the following conditions 1 and 2 are satisfied, the CPU determines that the learning completion condition is satisfied.

Condition 1: The number of learning times N is equal to or greater than the predetermined number of times Nth.

Condition 2: The number of the parking routes PR whose deviation distance from an averaged route is equal to or smaller than a threshold distance is equal to or larger than a threshold number. The CPU acquires the averaged route by averaging the respective parking routes PR.

It should be noted that the CPU may determine that the learning completion condition is satisfied when at least one of Condition 1 and Condition 2 is satisfied.

When the learning completion condition is satisfied, in step 450, the CPU determines that the learning of the parking route PR of the "vehicle VA in which communication is established" has been completed. The process proceeds to step 495 so that the CPU temporarily terminates the present routine.

When the CPU determines in step 405 that the communication has not been established, when the CPU determines in step 410 that the learning of the parking route PR of the "vehicle VA for which communication has been established" has been completed, when the CPU determines in step 420 that the learning of the parking route PR has not been started, and when the CPU determines in step 450 that the learning completion condition has not been satisfied, the process proceeds to step 495 so that the CPU temporarily terminate the present routine.

<Obstacle Determination Routine>

When an appropriate time point comes, a process starts from step 500 of FIG. 5 and proceeds to step 505. Steps 505 and 510 are the same as steps 405 and 410 shown in FIG. 4, respectively, and thus description thereof will be omitted.

When the communication has been established and the learning of the parking route PR has been completed, the CPU determines in step 515 whether or not the automatic parking is requested to start. When the input terminal such as the smartphone detects the predetermined manipulation operation, the input terminal transmits a start signal to the parking assist apparatus 10. When the CPU receives the start signal, the CPU determines that the automatic parking is requested to start, and executes steps 520 to 530. It should be noted that the CPU may determine that the automatic parking is requested to start when the automatic parking switch 36 is operated.

Step 520: The CPU acquires the captured image from the outside-vehicle camera 14 as comparative image C1.

Step 525: The CPU acquires a predetermined learned image LI from the learning images LI. As an example, the CPU acquires the learned image LI which is acquired when the last learning of the parking route PR starts.

Step 530: The CPU refers to the comparative image CI and the learned image LI so as to determine whether or not an obstacle is present in the parking route PI in the comparative image C1. For example, the CPU may determine whether or not the obstacle is present by applying a background subtraction method to the comparative image CI and the learned image LI. Further, the CPU may determine whether or not the obstacle is present based on difference in texture between the comparative image CI and the learned image LI.

When the CPU determines that the obstacle is not present, the CPU transmits a ready-to-start signal to the vehicle VA in step 535. The process proceeds to step 595 so that the CPU temporarily terminates the present routine. When the vehicle VA receives the ready-to-start signal, the vehicle VA starts the automatic parking (that is, the vehicle VA actually starts to travel toward the parking space PS).

On the other hand, when the CPU determines that the obstacle is present, the CPU performs an obstacle notification control in step 540. The process proceeds to step 595 so that the CPU temporarily terminates the present routine. The obstacle notification control is a control for notifying the user that the obstacle is present in the parking route PR, and may be referred to as a "second notification control". Specifically, the CPU may cause the smartphone 16 to display an obstacle notification screen for notifying that the obstacle is present, or may cause the smartphone 16 or the speaker 18 to output a sound (or an alarm sound) for notifying that the obstacle is present.

When the CPU determines in step 505 that the communication has not been established, when the CPU determines in step 510 that the learning of the parking route PR has not been completed, or when the CPU determines in step 515 that the automatic parking is not requested to start, the process proceeds to step 595 so that the CPU temporarily terminates the present routine.

<Deviation Determination Routine>

When an appropriate time point comes, a process starts from step 600 of FIG. 6 and proceeds to step 605. Steps 605 and 610 are the same as steps 405 and 410 shown in FIG. 4, respectively, and thus description thereof will be omitted.

When the communication has been established and the learning of the parking route PR has been completed, the CPU determines whether or not the position information has been received in step 615. When the CPU determines that the position information has been received, the CPU executes steps 620 to 640.

Step 620: The CPU acquires the captured image from the outside-vehicle camera 14 as the comparative image C1.

Step 625: The CPU acquires the position of the vehicle VA in the comparative image CI as the present image position CPP.

Step 630: The CPU refers to the learning route information 120 so as to acquire the image position PP associated with the "recognition position RP closest to the recognition position RP included in the position information" as the learned image position LPP.

Step 635: The CPU acquires the distance D between the present image position CPP and the learned image position LPP.

Step 640: The CPU determines whether or not the distance D is greater than the threshold distance Dth.

When the CPU determines that the distance D is greater than the threshold distance Dth, the CPU determines that the vehicle VA deviates from the learned route PR. In step 645, the CPU executes the deviation control, and the process proceeds to step 695 so that the CPU temporarily terminates the present routine.

When the CPU executes the deviation notification control as the deviation control, the CPU transmits a display command for displaying the deviation notification window to the smartphone 16, and transmits an output command for outputting a sound for notifying the deviation to the smartphone 16 and/or the speaker 18.

When the CPU executes the stop control as the deviation control, the CPU transmits a stop command to the vehicle VA. When the vehicle VA receives the stop command, the power management ECU40 controls the powertrain actuator 42 in such a manner that that no driving force is generated. Further, the brake ECU50 controls the brake actuator 52 in such a manner that "a predetermined braking force for stopping the vehicle VA" is applied to the vehicle VA.

As described above, when the parking assist apparatus 10 performs the automatic parking after learning the parking route PR, the parking assist apparatus 10 determines whether or not the vehicle VA deviates based on the present image position CPP and the learned image position LPP. Accordingly, the parking assist apparatus 10 can accurately determine that the vehicle VA deviates from the parking route PR, and can appropriately perform the deviation control.

Further, the parking assist apparatus 10 stores (learns) the recognized position RP and the image position PP in association with each other. Then, the parking assist apparatus 10 searches for the learned image position LPP to be compared with the present image position CPP by using the recognized position RP included in the received position information as a search key. Accordingly, the parking assist apparatus 10 can more accurately determine whether or not the vehicle VA deviates from the parking route PR.

First Modification

The parking assist apparatus 10 may be installed anywhere as long as the parking assist apparatus 10 can communicate with the vehicle VA and the outside-vehicle camera 14. Therefore, the parking assist apparatus 10 may be installed in the vehicle VA.

Second Modification

In the above-described embodiment, when the distance D between the current image position CPP and the "image position PP of the learned route information 120 closest to the recognized position RP included in the received position information" is greater than the threshold distance Dth, the CPU determines that the vehicle VA deviates from the parking route PR. In the present modification, when the distance D between the present image position CPP and the "image position PP of the learned route information 120 closest to the current image position CPP" is greater than the threshold distance Dth, the CPU may determine that the vehicle VA deviates from the parking route PR.

Third Modification

Although the CPU learns the parking route PR when the vehicle VA performs the manned automatic parking, the CPU may learn the parking route PR when the vehicle VA performs the manual parking. Here, the vehicle VA recognizes the position of the vehicle VA based on the position of the vehicle VA when the manual parking starts.

Fourth Modification

Although the CPU determines whether or not the vehicle VA deviates while the vehicle VA is performing the unmanned automatic parking, the CPU may determine whether or not the vehicle VA deviates while the vehicle VA is performing the manned automatic parking.

Fifth Modification

The above-described embodiment is applicable not only to a vehicle VA that performs the automatic parking based on the learned manual parking route MRP, but also to a vehicle VA that generates parking route PR every time the automatic parking is performed so as to performs the automatic parking based on the parking route PR.

What is claimed is:

1. A parking assist apparatus configured to perform a deviation control when the parking assist apparatus determines that a vehicle that is performing an automatic parking deviates from a learned route, the automatic parking being a control for automatically parking the vehicle in a parking space, the learned route being a parking route that the parking assist apparatus has learned,
wherein, the deviation control includes a first notification control for notifying a user that the vehicle deviates from the learned route and a stop control for stopping the vehicle,
wherein, the parking assist apparatus is configured to:
learn, as the learned route, a position of the vehicle in each of multiple learned images that an outside-vehicle camera acquires by capturing a space including the vehicle and the parking space multiple times while the vehicle is performing a manual parking or the automatic parking to the parking space; and
perform the deviation control when the parking assist apparatus determines that the vehicle deviates from the learned route based on a position of the vehicle in a comparative image and a position of the vehicle in the learned image, the comparative image being an image that the outside-vehicle camera acquires while the vehicle is performing the automatic parking after the parking assist apparatus completes learning the learned route.

2. The parking assist apparatus according to claim 1, wherein, the vehicle is configured to recognize a recognition position so as to transmit position information including the recognition position to the parking assist apparatus while the parking assist apparatus is learning the learned route or while the vehicle is performing the automatic parking after the parking assist apparatus completes learning the learned route, the recognition position being a position of the vehicle based on a predetermined reference position,
wherein, the parking assist apparatus is configured to:
store the recognition position included in the position information and the position of the vehicle in the learned image in association with each other, when the parking assist apparatus receives the position information while learning the learned route; and
determine whether or not the vehicle deviates from the learned route based on the position of the vehicle in the comparative image and the position of the vehicle in the learned image associated with the recognition position which is the closest to the recognition position included in the position information, when the parking assist apparatus receives the position information after completing learning the learned route.

3. The parking assist apparatus according to claim 1, wherein the parking assist apparatus is configured to perform an obstacle control including a second notification control for notifying the user that an obstacle is present in the learned route and the stop control, when the parking assist apparatus determines that the obstacle is present in the learned route based on the comparative image.

4. The parking assist apparatus according to claim 1, wherein the parking assist apparatus is configured to perform a second notification control for notifying the user that an obstacle is present in the learned route, when the parking assist apparatus determines that the obstacle is present in the learned route based on an image acquired by the outside-vehicle camera during a time period from a time point at which the parking assist apparatus completes learning the learned route to a time point at which the vehicle starts the automatic parking.

5. The parking assist apparatus according to claim 1, wherein the parking assist apparatus is configured to:
learn, as the learned route, a parking route that the vehicle travels while the vehicle with a driver is performing the manual parking or the automatic control to the parking space; and
determine whether or not the vehicle deviates from the learned route while the vehicle without the driver is performing the automatic parking after the parking assist apparatus completes learning the learned route.

* * * * *